United States Patent Office 3,121,248
Patented Feb. 18, 1964

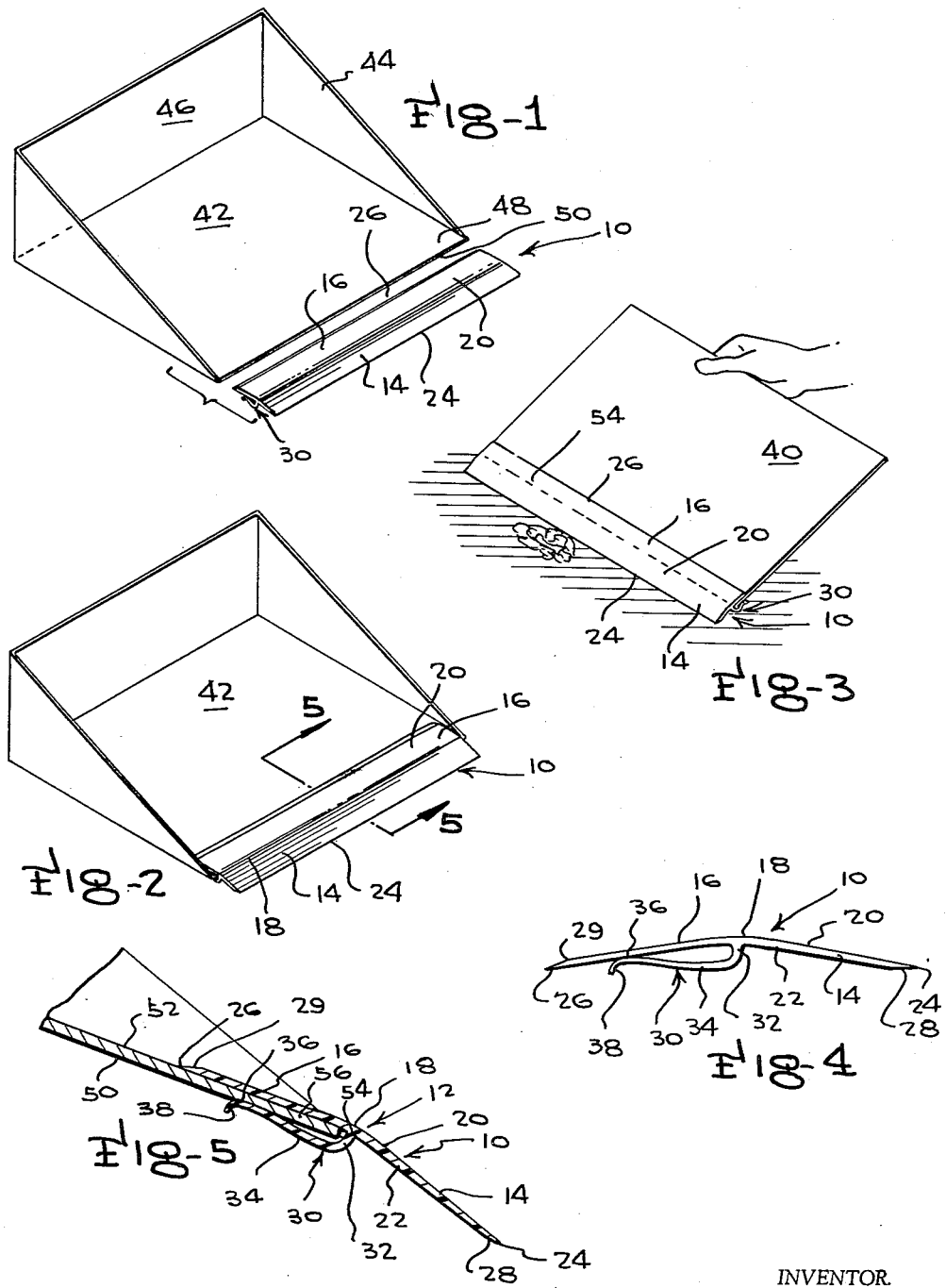

3,121,248
SWEEPING ATTACHMENT
Thomas S. Ferguson, 1 Irving Lane, Orinda, Calif.
Filed June 14, 1963, Ser. No. 287,902
3 Claims. (Cl. 15—257.9)

This invention relates to sweeping attachments, and more specifically, to a sweeping attachment which converts a sheet of cardboard, a carton, or other readily available material into a satisfactory gathering receptacle for swept material. This application is a continuation-in-part of my copending application Serial No. 238,847, filed November 20, 1962, now abandoned.

It is recognized that attachments intended to adapt available containers for use as sweeping receptacles have been previously proposed. However, a critical characteristic of a sweeping container is that the entrance portion must be obstructed by upwardly projecting elements so that materials may be readily swept over the entrance portion and onto the container. None of the previously proposed appliances have accomplished this objective. The device of this invention supplies a sharp leading edge, a gently upwardly inclined leading section, and a rearwardly inclined rear section smoothly merging into the container bottom wall thereby to provide an unobstructed passage of swept material thereover.

Another important objective of the invention is to provide a leading edge adapted to closely fit against the floor or other area being swept, the leading edge being relatively resilient whereby to conform to the floor to prevent passage of materials thereunder.

Another object of the invention is to provide a device adapted to readily convert a cardboard box, a sheet of cardboard or the like, or a lawn mower grass catcher into an inexpensive dust pan or refuse collector of a width to readily accommodate sweeping devices of substantial width such as push brooms and the like.

Yet another object of the invention is the provision of an attachment of the class noted above comprising an elongate body portion having an inclined forward section, the forward section having a leading edge tapered at one side to adapt it for close contact with the surface to be swept, means for connection of the body portion to a receptacle, and an oppositely inclined rear section adapted to direct swept materials into the receptacle.

General objectives of the invention include the provision of a sweeping attachment of the type discussed above, which is noncomplex in construction and assembly, inexpensive to manufacture, and durable in use.

Other and further objects and advantages of the invention will become apparent from a consideration of the following specification when read in conjunction with the annexed drawing, in which:

FIGURE 1 is a disassembled perspective view of a receptacle and sweeping attachment of this invention;

FIGURE 2 is a view similar to FIGURE 1, showing the assembled condition of the receptacle and attachment of FIGURE 1;

FIGURE 3 is a perspective view of the attachment as applied to a modified type of receptacle;

FIGURE 4 is an enlarged side elevational view of the attachment per se; and

FIGURE 5 is an enlarged, detail cross sectional view taken substantially on the line 5—5 of FIGURE 2, looking in the direction of the arrows.

Proceeding to a more detailed description of the invention, as seen in the drawing, the attachment hereof is generally designated by reference numeral 10. The attachment 10 is preferably formed of a plastic material and is of unitary formation.

The device 10 includes a main body portion 12 which is elongated and comprises a substantially rectangular forward section 14 and an angularly related, substantially rectangular rear section 16. The forward and rear sections 14, 16 are integrally connected at an apex portion 18 substantially at the center of the main body portion and have upper sides 20 and lower sides 22, inclined downwardly from the apex portion 18.

The forward and rear sections 14, 16, have distal edges 24, 26, respectively, which taper to points as shown. As best seen in FIGURES 4 and 5, the distal edge 24 is tapered along the lower side 22 to provide a flat leading end portion 28 along the underside of the device, while the edge 26 is tapered along the upper side 20 to provide a flat trailing end portion 29.

Depending from the lower side of the main body portion at a location generally vertically aligned with the apex portion 18 is a clip member 30 which is preferably of integral formation and coextensive in width with the body portion extending from end to end thereof. The clip member 30 comprises a connection leg 32 of arcuate section connected integrally to a rearwardly extending holding portion 34 arranged below the rear section 16 and, as seen in FIGURE 4, normally abutting the lower side 22 at its end 36. A rebent outer lip 38 provides an entrance portion for the clip. The clip is of resilient material whereby a clamping action between the lower side 22 of the main body portion and the end 36 is provided.

The device 10, which can of course be supplied in any desired dimension, is preferably of a width at least equal to larger sweeping appliances such as push brooms and the like. The device may be used with such readily available receiving receptacles as a flat sheet of cardboard 40 (FIGURE 3), or a specially cut section 42 of cardboard box (FIGURES 1 and 2), having side walls 44, a back wall 46, and a bottom wall 48 with underside 50 and upper surface 52. In either case, or where other selected receptacle means which include at least one straight edge 54 is selected, the device 10 is secured thereto about a forward portion 56 thereof. As best seen in FIGURE 5, the rear section 16 bears substantially flush against the upper surface 52 of the wall 48, with the clip end portion 36 clamping against the underside 50, there being no possibility of debris becoming entrapped between the portion 16 and upper surface 52.

In use, debris is swept over the portions 14, 18, and 16 and onto the wall 48. Due to the inclination of the section 16, the likelihood of inadvertent release of swept material from the receptacle is materially reduced. As the receptacle 40 or 42 becomes soiled or worn, it may be conveniently discarded in favor of substitute receptacles. The provision of the flat portion 28 at the leading extension of the device 10, taken with the resiliency of the material formation permits the device to be positioned close against the surface to be swept, obviating the possibility of material being swept under the device rather than into the receptacle. The flat surface 29 aids in the passage of the swept debris over the device 10.

Having described and illustrated the invention in detail, it will be understood that this description and illustration is offered merely by way of example, and that the invention is to be limited in scope only by the appended claims.

What is claimed is:

1. The combination, with a box having a bottom wall, side walls, and a rear wall, the bottom wall having a forward portion including a leading edge and having inner and outer sides, of a sweeping attachment comprising:
    (a) an elongated body portion including angularly related forward and rear sections integrally connected at an apex section;
    (b) the body portion having upper and lower surfaces;
    (c) the forward and rear sections having distal edges;
    (d) the distal edges of the forward and rear sections being oppositely tapered to provide sharp leading and trailing edges on the body portion;

(e) a clip member, coextensive in width with the body portion and depending integrally therefrom;

(f) the clip member including an arcuate connection leg secured to the body portion in substantially vertical alignment with the apex section, a holding arm extending rearwardly subjacent the rear section and normally abutting the underside of the body portion, and a rebent entrance portion; and (g) the body portion being secured over the inner side of the box bottom wall adjacent the leading edge thereof with the apex portion substantially vertically aligned with its leading edge, and with the clip member engaging the outer side, whereby the body portion upper surface merges smoothly with the box bottom wall inner side and the body portion leading edge is adapted for placement against a surface to be swept and to be in flush relation therewith.

2. The combination of claim 1, wherein the body portion and clip member are formed of a plastic material.

3. The combination, with a trash receptacle having at least a bottom wall, the bottom wall including a straight leading edge and upper and lower sides, of a sweeping attachment comprising:

(a) an elongated body portion including angularly related forward and rear sections integrally connected at an apex section;

(b) the body portion having upper and lower surfaces;

(c) the forward and rear sections having distal edges;

(d) the distal edges of the forward and rear sections being oppositely tapered to provide sharp leading and trailing edges on the body portion, the tapered portion of the rear section being on the upper side thereof, and the tapered portion of the forward section being on the lower side thereof;

(e) a clip member of resilient plastic, coextensive in width with the body portion and depending integrally therefrom;

(f) the clip member including an arcuate connection leg secured to the body portion in substantially vertical alignment with the apex section, bearing against the leading edge of the receptacle bottom wall, a holding arm extending rearwardly subjacent the rear section and normally abutting the underside of the body portion, and a rebent entrance portion; and (g) the body portion being secured over the inner side of the receptacle bottom wall adjacent the leading edge thereof with the apex portion substantially vertically aligned with its leading edge and with the clip member engaging the outer side, whereby the body portion upper surface merges smoothly with the receptacle bottom wall and the body portion leading edge is adapted for placement against the surface to be swept in flush relation therewith.

References Cited in the file of this patent
UNITED STATES PATENTS

| | | |
|---|---|---|
| 608,635 | Bartholomew | Aug. 9, 1898 |
| 1,182,190 | Magami | May 9, 1916 |
| 3,082,455 | Evancha | Mar. 26, 1963 |